United States Patent [19]
Hayes

[11] Patent Number: 5,851,570
[45] Date of Patent: Dec. 22, 1998

[54] ELECTRIC DRIVE FOR BLOW MOLDING HEAD

[76] Inventor: Robert O. Hayes, 6 Edgewater Cir., Lake St. Louis, Mo. 63367

[21] Appl. No.: 874,009

[22] Filed: Jun. 12, 1997

[51] Int. Cl.⁶ .......................... B29C 47/22; B29C 49/04
[52] U.S. Cl. ..................... 425/532; 425/381; 425/466; 264/541
[58] Field of Search ................... 425/532, 381, 425/466; 264/541

[56] References Cited

U.S. PATENT DOCUMENTS

| | | | |
|---|---|---|---|
| 2,632,202 | 3/1953 | Haines | 264/541 |
| 3,135,018 | 6/1964 | Smith | 425/141 |
| 3,353,209 | 11/1967 | Schad | 425/145 |
| 3,480,999 | 12/1969 | Carlo | 425/381 |
| 3,584,091 | 6/1971 | Nave | 425/166 |
| 3,621,518 | 11/1971 | Gallizia | 425/140 |
| 3,798,295 | 3/1974 | MacDuff | 425/529 |
| 3,861,841 | 1/1975 | Hanning | 425/146 |
| 4,394,116 | 7/1983 | Kuenzig et al. | 425/532 |
| 4,772,830 | 9/1988 | Kobari et al. | 318/563 |
| 4,954,301 | 9/1990 | Saeki et al. | 264/40.1 |
| 5,023,028 | 6/1991 | Kamiguchi et al. | 264/40.1 |
| 5,059,375 | 10/1991 | Lindsay | 425/381 |
| 5,110,522 | 5/1992 | Inaba et al. | 264/40.4 |
| 5,269,672 | 12/1993 | DiGangi, Jr. | 425/150 |
| 5,338,173 | 8/1994 | Kato et al. | 425/532 |
| 5,444,348 | 8/1995 | Garrec | 318/640 |
| 5,478,229 | 12/1995 | Kato et al. | 425/532 |
| 5,531,580 | 7/1996 | Bonino et al. | 425/136 |
| 5,645,873 | 7/1997 | Carter, Jr. | 425/381 |

*Primary Examiner*—Robert Davis
*Attorney, Agent, or Firm*—Grace J. Fishel

[57] ABSTRACT

An electric drive for controlling the die gap in a continuous blow molding head and the die gap and pushout in an accumulator blow molding head. The electric drive includes a programming screw for attachment to a programming rod for setting the die gap, a programming nut and an electric motor for rotating the programming nut. In an accumulator blow molding head, the electric drive further includes a shooting screw for attachment to a shooting rod for controlling pushout, a shooting nut and an electric motor for rotating the shooting nut. The programming screw and the shooting screw are coaxial with the programming rod passing through the shooting screw.

9 Claims, 4 Drawing Sheets

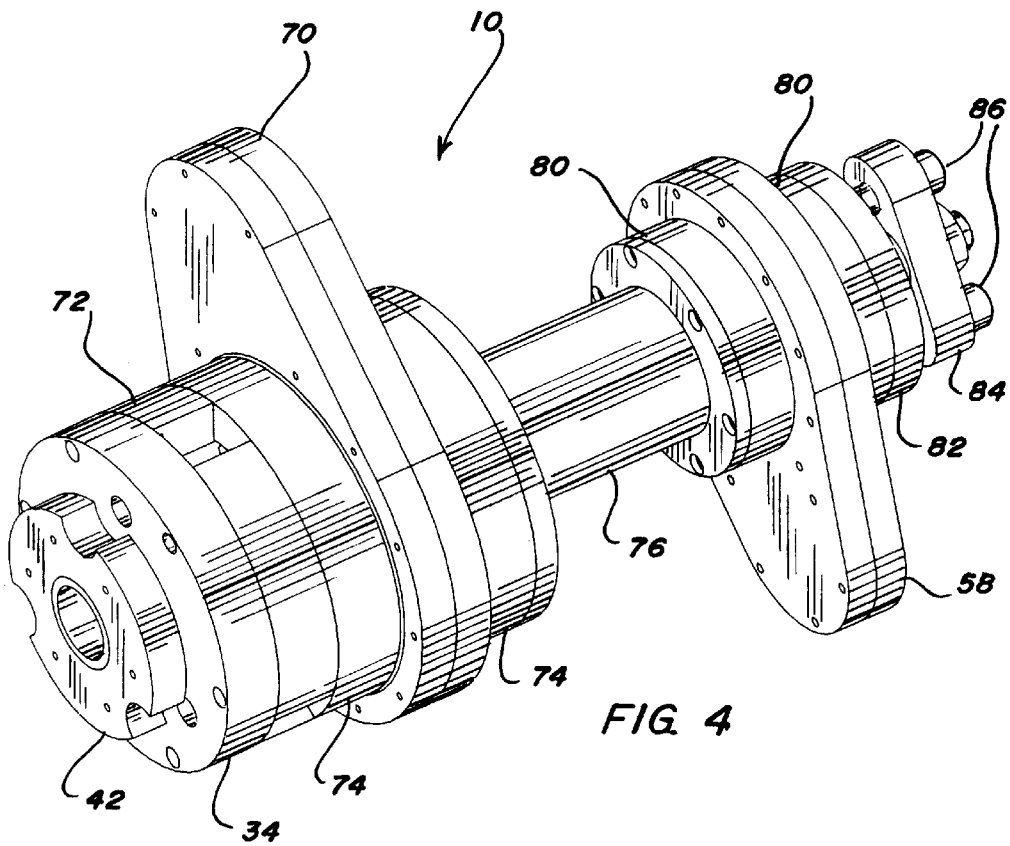
FIG. 4
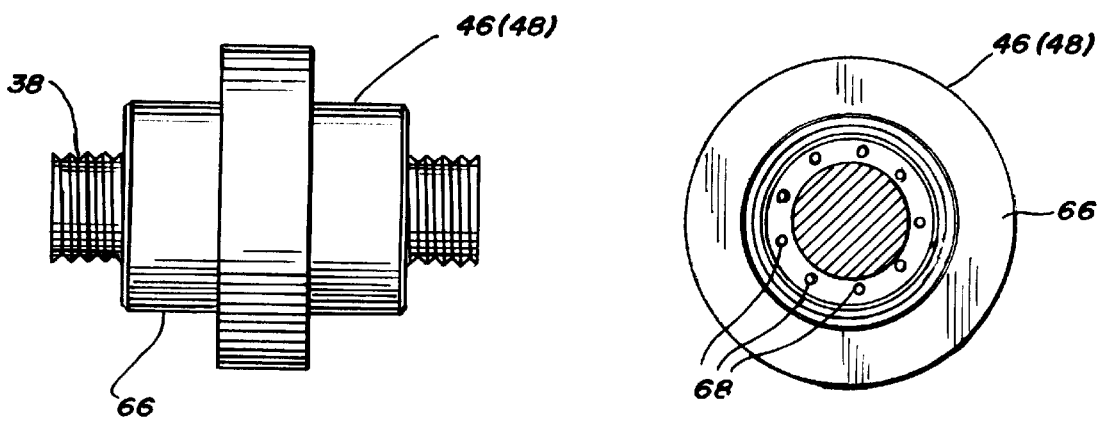
FIG. 5
FIG. 6

ELECTRIC DRIVE FOR BLOW MOLDING HEAD

BACKGROUND OF THE INVENTION

1. Field of the Invention

The present invention relates to an electric drive for controlling the die gap and accumulator pushout in a blow molding head.

2. Brief Description of the Prior Art

In the production of parts in a blow molding head, the die gap setting and accumulator pushout are typically performed by hydraulic actuating cylinders coupled to a programming rod for setting the die gap and a shooting rod connected to a plunger. The die gap determines the wall thickness of the parison being formed and the plunger determines the shot weight.

With hydraulic actuators, a wide installation space is required to accommodate a hydraulic pump and surrounding necessary devices such as piping. Hydraulic fluids are flammable unless special, non-flammable oils are used. There are typically heater bands around the blow molding head, above which the hydraulic actuators are positioned and there is usually some oil leakage, particularly in a hydraulic system that has been operated for a while. The temperature of the heater bands is below the flash point of the oil but is enough to vaporize the oil, producing a fine oil mist, which can be explosively flammable.

For high quality blow molding, it is essential that the die gap and pushout be meticulously controlled as these factors determine the wall thickness and the length of the parison, which in turn, affects the part being molded. It is known that an electric motor, particularly a servo motor, provides a "stiffer" system for controlling positioning. As compared to a hydraulic actuator, a servo motor is dynamically faster, facilitating a more controllable system resulting in better quality parts.

Servo motors have been used in injection molding to control an extruder but, for most applications, have required support systems, including guide rods and the like, since the servo motor is reciprocated with the extruder. Insofar as known, electric drives have not been used with blow molding heads, leastwise coaxial electric drives for setting both the die gap and controlling pushout.

SUMMARY OF THE INVENTION

In view of the above, it is an object of the present invention to improve die gap and pushout control in a blow molding head thereby facilitating the production of better quality parts. It is another object to eliminate oil mists. Other objects and features of the invention will be in part apparent and in part pointed out hereinafter.

In accordance with the present invention, an electric drive is provided for a blow molding head with a tooling set including a programming rod for setting a die gap. In major part, the electric drive includes a programming screw, programming nut and an electric motor rotatably coupled to the programming nut. The programming screw is adapted for straight line attachment to a programming rod distal a die gap and the programming nut is threaded on the programming screw with the nut fixed with respect to the die gap. When the programming nut is rotated by the electric motor, the programming nut causes rectilinear movement of the programming screw in a direction depending on the direction in which the programming nut is rotated for use in setting the die gap.

When the blow molding head is an accumulator head with a plunger mounted on a shooting rod for controlling pushout, the electric drive additionally includes, in major part, a shooting screw, shooting nut and a second electric motor rotatably coupled to the shooting nut. The programming screw and the shooting screw are coaxial, each serving as a guide rod and providing side support for the other. The shooting screw is adapted for straight line attachment to a shooting rod for reciprocating a plunger and the shooting nut is threaded on the shooting screw with the nut fixed with respect to the die gap. When the shooting nut is rotated by the electric motor, the shooting nut causes rectilinear movement of the shooting rod in a direction depending on the direction in which the shooting nut is rotated for use in controlling pushout.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings in which:

FIG. 4 is an assembled perspective view of the electric drive shown in FIG. 3;

FIG. 5 is a side view of the programming and shooting nuts; and,

FIG. 6 is an end view of the programming and shooting nuts.

DETAILED DESCRIPTION OF THE INVENTION

Figure 1:
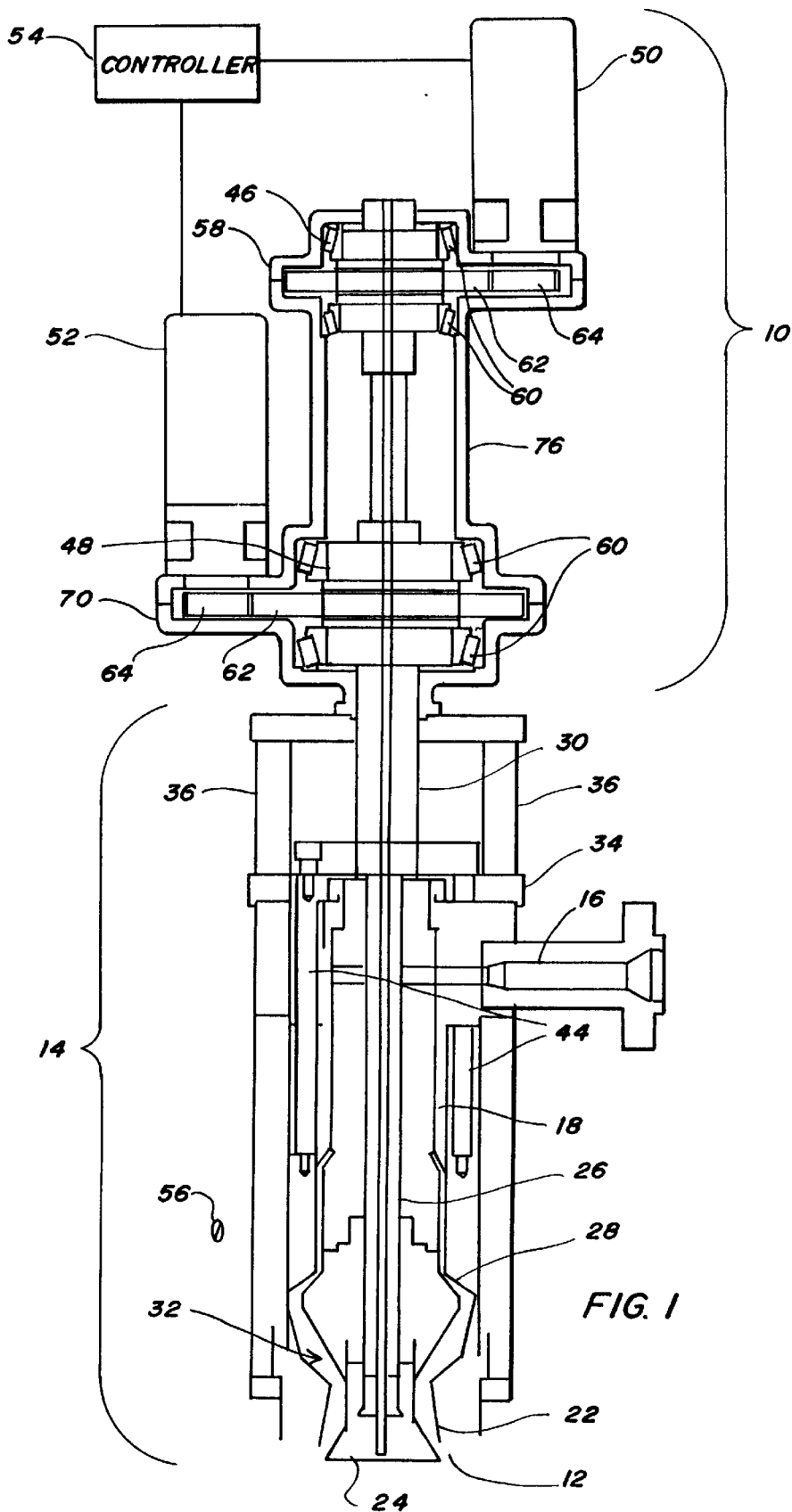
FIG. 1 is a schematic elevational sectional view of an electric drive in accordance with the present invention shown mounted on an accumulator blow molding head.
Figure 2:
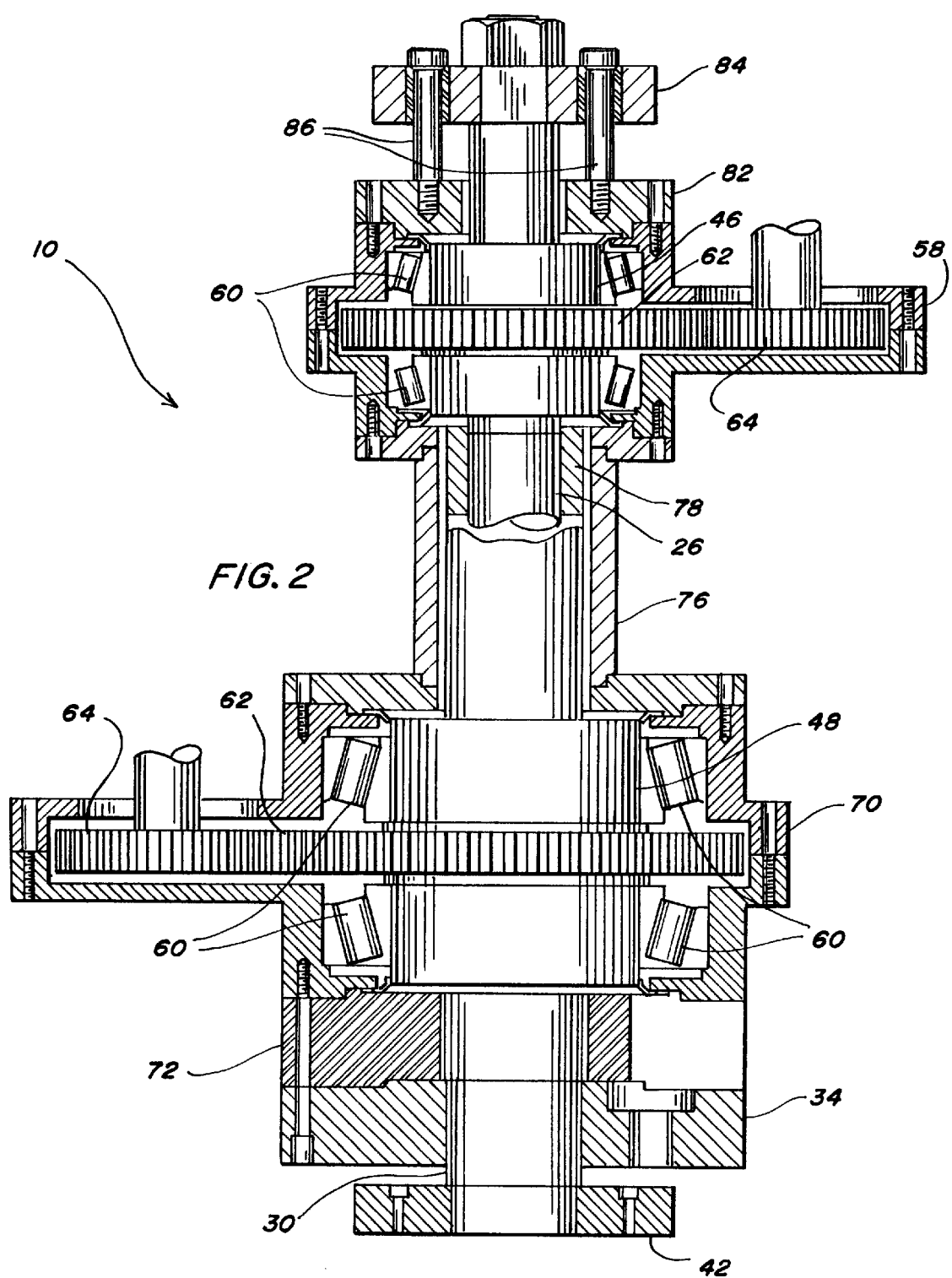
FIG. 2 is an elevational sectional view of the electric drive with the programming and shooting motors deleted for purpose of clarity.
Figure 3:
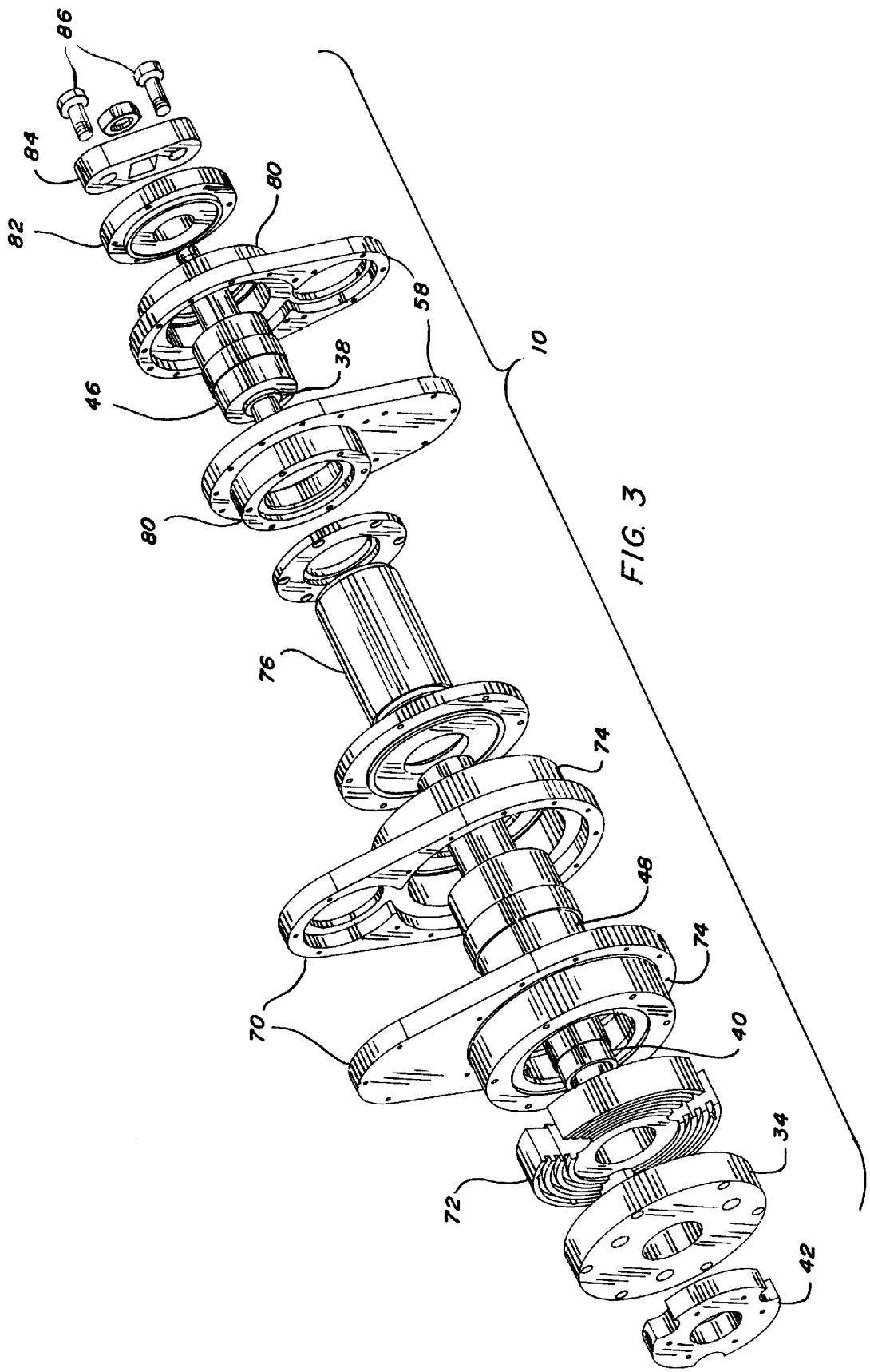
FIG. 3 is an exploded perspective view of the electric drive with the programming and shooting motors, bearings and gears deleted for purpose of clarity.

Referring to the drawings more particularly by reference character, as shown in FIG. 1, reference numeral 10 refers to an electric drive for setting a die gap 12 in accordance with the present invention for use with a blow molding head 14. Blow molding head 14 is wrapped with heater bands (not shown) and has an input port 16 through which molten plastic is supplied by a feeder (not shown). As the molten plastic enters blow molding head 14, it spirals around a core tube 18, forming an annulus of plastic, the thickness of which is controlled by a tooling set 20. With continuing reference to FIG. 1, tooling set 20 includes a flared valve seat or die ring 22 into which is received a valve or poppet 24 provided at the distal end of a programming rod 26. Programming rod 26 serves as a valve stem for lifting poppet 24 from seated arrangement with die ring 22, setting die gap 12, or closing it entirely. When tooling set 20 is outwardly flared (i.e., diverging tooling), programming rod 26 is in tension as the plastic flows through the die gap. With converging tooling, on the other hand, programming rod 26 is under compression because the molten plastic tends to push the programming rod up. As will be readily understood by those skilled in the art, the width of die gap 12 is dictated by the required wall thickness of the parison, which depends on the part being molded.

Blow molding head 14 can be a continuous blow molding head or an accumulator blow molding head. In a continuous blow molding head, the width of the die gap is a time based function under the control of a microprocessor as described below. As the parison is formed, a mold clamps on the lower end of the parison, pinching off the lower part, during which time the parison may be inflated with a gas passing through programming rod 26 which is hollow for that purpose. In other cases, when the top of the part is closed, the parison can be punctured at some other location and inflated. The mold is opened after the part has formed, restarting the cycle.

An accumulator blow molding head has a plunger 28 mounted on a shooting rod 30. An accumulator chamber 32 is formed around core tube 18 between plunger 28 and die gap 12. At the beginning of a cycle, plunger 28 is above input port 16 and die gap 12 is closed while accumulator chamber 32 is filled with molten plastic by the feeder. During pushout, as in a continuous blow molding head, the width of die gap 12 is adjusted with programming rod 26 to form a parison with the required wall thickness.

As shown in FIGS. 1–4, electric drive 10 is mounted on a support plate 34 above blow molding head 14 on a plurality of support columns 36. Electric drive 10 includes a programming screw 38, a distal end of which is adapted for straight line attachment to programming rod 26, and a shooting screw 40 adapted for straight line attachment to shooting rod 30, with which it may be integral. In the embodiment illustrated in the drawings, a distal end of shooting rod 30 is adapted for attachment to a plunger ring 42 to which plunger rods 44 are attached parallel with the shooting screw. Programming screw 38 and shooting screw 40 are coaxial, each screw serving as a guide rod and providing side support for the other. A programming nut 46 is threaded on programming screw 38 and a shooting nut 48 is threaded on shooting screw 40. Rotation of programming nut 46 causes rectilinear movement of programming screw 38 in a direction depending on the direction in which the programming nut is rotated. In a comparable manner, rotation of shooting screw 40 causes rectilinear movement of shooting screw, up or down, depending on the direction in which the shooting nut is rotated.

A first electric motor 50 is rotatively coupled to programming nut 46 and a second electric motor 52 is coupled to shooting nut 48. Motors 50, 52 are preferably servo motors because of the speed with which they can be stopped, started, reversed and come up to full speed. An electronic controller 54 such as a programmable microprocessor regulates the start and stop operation of motors 50, 52, their direction of rotation and their speed of rotation thereby controlling die gap 12 and plunger 28. In an accumulator blow molding head, the downward distance traveled by plunger 28 determines the volume of material extruded. Controller 54 is therefore programmed to know how far up plunger 28 needs to go for a certain weight of material and a linear measuring device 56 is provided for detecting a position on plunger 28 indicating a required shot weight. Controller 54 causes shooting motor 52 to slightly assist the upward movement of plunger 28 thereby reducing the amount of backpressure on the plastic as it fills accumulator chamber 32. When linear measuring device 56 detects the position on the plunger, it sends a signal to controller 54. Controller 54 then operates programming motor 50, causing programming rod 26 to regulate die gap 12, while simultaneously operating shooting motor 52, causing plunger 28 to push out the material at a selected rate.

More particularly, with continuing reference to FIGS. 1–4, programming nut 46 is supported in a programming nut housing 58 on a paired row of bearings 60. Opposite ends of programming nut 46 may be machined to accept bearings 60. Bearings 60 are preferably roller bearings, more particularly tapered roller bearings, although deep groove ball bearings and the like may be utilized, depending on bearing design and load and life expectancies. Programming nut 46 has a gear 62 secured by a key or the like to the outside for rotative driving of the nut and, on the inside, is threadably engaged with programming screw 38. Programming electric motor 50 has an output shaft to which is keyed a side spur gear 64 meshing with gear 62 on programming nut 46. A pair of tapered roller bearings 60, positioned back to back, are preferred because they take the axial load applied by the meshing of gears 62, 64 which otherwise would tend to kick them apart. As aforementioned, rotation of programming nut 46 by motor 50 causes rectilinear movement of programming screw 38 in a direction depending on the direction in which the programming nut is rotated.

Programming nut 46 can be a roller nut or a ball nut, depending on load and life expectancy. For heavy loads, it is preferred that programming nut 46 be a roller nut as shown in FIGS. 5 and 6. Programming roller nut 46 includes a cylinder 66 which is internally threaded and a set of planetary rollers 68 which are in mesh, in line-contact, with cylinder 66 and programming screw 38. The pitch of the threads on internally threaded cylinder 66, planetary rollers 68 and programming screw 38 is the same. The ends of rollers 68 are journaled in a retainer attached to cylinder 66 so that there is no linear movement of rollers 68 with respect to cylinder 66. Rotation of cylinder 66, however, causes programming screw 38 to be moved in and out.

Shooting nut 48 is identical to programming nut 46 in function and is similarly housed in a shooting nut housing 70, other corresponding parts being numbered accordingly.

Focusing now on FIGS. 2–6 in finer detail, it is seen that a spacer plate 72 (not shown in FIG. 1) is provided between support plate 34 and electric drive 10 for dissipation of heat from the blow molding head below. Support plate 34 has an aperture (so does spacer plate 72) through which a distal end of shooting screw 40 passes for threaded attachment with plunger ring 42 below. Contact between plunger ring 42 and support plate 34 provides an upper limit of travel for shooting screw 40. Shooting nut housing 70 includes upper and lower mating sections with opposing flanges 74, the lower one of which is bolted or otherwise attached to support plate 34, spacer plate 72 intermediate thereof. Upper flange 74 is attached to a flanged adapter tube 76. By changing the length of the adapter tube, electric drive 10 can be easily adapted for use with different sized blow molding heads, no other changes being required. A bushing 78 may be provided in the upper end of flanged adapter tube 76 to provide side support for programming rod 26 which passes therethrough. Side support may be needed when tooling set 20 is convergent and programming rod 26 is placed under compression as the molten plastic passes through die gap 12. Programming nut housing 58, like shooting nut housing 70, includes upper and lower mating sections with opposing flanges 80, the lower one of which is bolted or otherwise attached to flanged adapter tube 76. Upper flange 80 is attached to a bearing retainer plate 82. Bearing retainer plate 82 has an aperture through which the upper end of programming screw 38 passes for attachment to a stop plate 84, providing an upper limit of travel for the shooting screw with diverging tooling. For converging tooling, bearing retainer plate 82 serves as a stop for stop plate 84. Perferably there is some clearance on the tooling set at full retraction to avoid possible damage. While mechanical stops, limiting upward travel, are provided for both the shooting and programming screws, in practice these limits are never reached, the movement of both screws being controlled by controller 54. As seen in the drawings, shooting screw 40 and programming screw 38 are coaxial, with programming rod passing through shooting screw 40. Programming screw 38 is reduced in diameter for threaded attachment of programming rod 26, shooting rod being reduced in diameter for threaded attachment of plunger ring 44.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. An electric drive for a blow molding head having a tooling set including a programming rod for setting a die gap, said electric drive comprising:

a programming roller screw adapted for straight line attachment to a programming rod distal a die gap;

a programming roller nut threaded on the programming roller screw, said programming roller nut fixed with respect to the die gap and supported in a programming roller nut housing on a paired row of tapered roller bearings, positioned back to back on opposite ends of the programming roller nut; and, an electric motor coupled in direct rotary relationship to the programming roller nut whereby rotation of the programming roller nut causes rectilinear movement of the programming roller screw in a direction depending on the direction in which the programming roller nut is rotated for use in setting the die gap.

2. The electric drive of claim 1 wherein the electric motor is a servo motor.

3. An electric drive for an accumulator blow molding head having a tooling set including a programming rod for setting a die gap and a plunger mounted on a shooting rod for controlling pushout comprising:

a programming screw adapted for straight line attachment to a programming rod distal a die gap;

a programming nut threaded on the programming screw, said nut fixed with respect to the die gap;

a first electric motor coupled in direct rotary relationship to the programming nut whereby rotation of the programming nut causes rectilinear movement of the programming screw in a direction depending on the direction in which the programming nut is rotated to set the die gap;

a shooting screw adapted for straight line attachment to a shooting rod for reciprocating a plunger, said programming screw and said shooting screw being coaxial and the programming rod passing through the shooting screw;

a shooting nut threaded on the shooting screw, said nut fixed with respect to the die gap;

a second electric motor coupled in direct rotary relationship to the shooting nut whereby rotation of the shooting nut causes rectilinear movement of the shooting screw in a direction depending on the direction in which the shooting nut is rotated to control pushout.

4. The electric drive of claim 3 wherein the programming nut and the shooting nut are roller nuts, said programming roller nut supported in a programming nut housing on a paired row of tapered roller bearings, positioned back to back on opposite ends of said programming roller nut and said shooting roller nut supported in a shooting nut housing on a paired row of tapered roller bearings, positioned back to back on opposite ends of said shooting roller nut.

5. The electric drive of claim 4 wherein the electric motors are servo motors.

6. The electric drive of claim 5 wherein an adapter tube is provided between the programming nut housing and the shooting nut housing, through which the programming rod passes, whereby the electric drive can be adapted for use with different sized blow molding heads by changing the length of the adapter tube.

7. The electric drive of claim 6 wherein a bushing is provided in the adapter tube for providing side support to the programming rod.

8. The electric drive of claim 5 including a electronic controller for regulating the stop and start operation, direction of rotation and speed of rotation of the servo motors.

9. The electric drive of claim 8 wherein the shooting screw and the shooting rod are integral and the shooting rod is adapted for attachment to a plunger ring to which plunger rods are attached parallel with the shooting screw, said plunger rods attached to the plunger.

* * * * *